(12) United States Patent
Aruga

(10) Patent No.: US 11,001,089 B2
(45) Date of Patent: May 11, 2021

(54) LAMINATE, PRINTED MATTER AND METHOD FOR ITS PRODUCTION

(71) Applicant: AGC Inc., Chiyoda-ku (JP)

(72) Inventor: Hiroshi Aruga, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/572,871

(22) Filed: Sep. 17, 2019

(65) Prior Publication Data

US 2020/0009893 A1    Jan. 9, 2020

Related U.S. Application Data

(63) Continuation of application No. PCT/JP2018/012206, filed on Mar. 26, 2018.

(30) Foreign Application Priority Data

Mar. 28, 2017    (JP) .............................. JP2017-063211

(51) Int. Cl.
*B32B 3/00* (2006.01)
*B41M 5/52* (2006.01)
(Continued)

(52) U.S. Cl.
CPC .......... *B41M 5/5209* (2013.01); *B41J 11/002* (2013.01); *B41M 7/0027* (2013.01); *E04B 2/00* (2013.01); *E04B 7/00* (2013.01)

(58) Field of Classification Search
CPC ... B41M 5/5209; B41M 7/0027; B41J 11/002
See application file for complete search history.

(56) References Cited

U.S. PATENT DOCUMENTS

| 8,685,533 B2 * | 4/2014 | Katayama | ................. C09C 3/12 |
| | | | 428/323 |
| 10,399,116 B2 * | 9/2019 | Aruga | ...................... C08J 7/042 |

(Continued)

FOREIGN PATENT DOCUMENTS

| JP | 08-11268 A | 1/1996 |
| JP | 8-11268 A | 1/1996 |

(Continued)

OTHER PUBLICATIONS

International Search Report dated Jun. 26, 2018 in PCT/JP2018/012206 filed on Mar. 26, 2018.

*Primary Examiner* — Elizabeth E Mulvaney
(74) *Attorney, Agent, or Firm* — Oblon, McClelland, Maier & Neustadt, L.L.P.

(57) ABSTRACT

To provide a laminate whereby, when a printed layer is formed by an inkjet printing system, the adhesion of the printed layer can be easily maintained and it is possible to obtain a printed matter having excellent durability; a printed matter using said laminate; and a method for producing the printed matter. The laminate comprises a film-shaped substrate 1 containing a first fluorinated polymer and a coating layer 3 present in contact directly with one side or each side of the substrate 1, wherein the coating layer 3 is a coating layer containing a second fluorinated polymer different from the first fluorinated polymer, the visible light transmittance of the substrate is 0% or more than 0%, and when it is more than 0%, the visible light transmittance difference expressed by the following formula (1), of the laminate, is at most 40%. Visible light transmittance difference=(visible light transmittance (%) of the substrate−visible light transmittance of the laminate)/visible light transmittance of the substrate×100 (%) (1).

20 Claims, 1 Drawing Sheet

(51) Int. Cl.
*B41J 11/00* (2006.01)
*B41M 7/00* (2006.01)
*E04B 2/00* (2006.01)
*E04B 7/00* (2006.01)

(56) References Cited

U.S. PATENT DOCUMENTS

| | | | |
|---|---|---|---|
| 10,400,079 B2* | 9/2019 | Aruga | ............... C09D 127/18 |
| 2010/0015436 A1 | 1/2010 | Aruga | |
| 2010/0021739 A1 | 1/2010 | Aruga et al. | |

FOREIGN PATENT DOCUMENTS

| | | |
|---|---|---|
| JP | 8-258228 A | 10/1996 |
| JP | 2009-034995 A | 2/2009 |
| JP | 2009-234048 A | 10/2009 |

* cited by examiner

LAMINATE, PRINTED MATTER AND METHOD FOR ITS PRODUCTION

TECHNICAL FIELD

The present invention relates to a laminate, a printed matter and a method for its production.

BACKGROUND ART

A fluororesin film is excellent in weather resistance, stain resistance, etc. and thus is useful as a film material in a film-structured building. A film-structured building is a building or construction in which a film material is used as a roofing material, an outer wall material etc., and, for example, an outdoor exhibition hall, a sports facility, an agricultural house, etc. may be mentioned.

Since a fluororesin film has a high visible light transmittance or solar transmittance, a film-structured building using the fluororesin film as a film material tends to be such that the inside is too bright, or the internal temperature is too high. Therefore, there are cases where it is required to control the visible light transmittance or solar transmittance of the fluororesin film.

As a method for reducing the visible light transmittance or solar transmittance, there may be a method of kneading, for example, a reflective pigment (such as mica coated with titanium oxide, titanium oxide, aluminum flakes, etc.) into the fluororesin film, or a method of forming a printed layer on the fluororesin film surface by using a printing ink containing the reflective pigment. In such a case, the printed layer is usually single-patterned and is formed in a length extending over a few hundreds meters or more on the fluororesin film surface. Further, gravure printing or screen printing is mainly used to form the printed layer. Hereinafter, the length of the printed layer formed on the film surface will be referred to also as the "printed length".

On the other hand, by printing a pattern other than a single pattern, such as the owner's name or its logo, an abstract design image, or a photograph, on the fluororesin film, it becomes possible to impart message properties or to improve design properties. However, the printed layer with such a pattern is, as is different from the above-mentioned printed layer with a single pattern, formed in a short printed length at a level of a few meters on the fluororesin film surface. Further, the pattern is often represented by various colors. If it is attempted to print such a pattern by gravure printing or screen printing, the cost for production of the printing plate will be expensive, and therefore, it is conceivable to print it by inkjet printing. In the inkjet printing, an ultraviolet (hereinafter referred to also as "UV") curable ink is often used.

However, adhesion between a resin film, particularly a fluororesin film, and a printed layer formed by inkjet printing (hereinafter referred to also as an "inkjet printed layer") is insufficient. Therefore, in order to improve the adhesion between the resin film and the inkjet printed layer, it has been proposed to subject the resin film surface to primer treatment. As a material to be used for the primer treatment, a primer composition containing an acrylic resin, a polyvinyl resin, a polyester, a polyacrylate, a polyurethane, etc. has been proposed (Patent Document 1).

PRIOR ART DOCUMENT

Patent Document

Patent Document 1: JP-A-2009-34995

DISCLOSURE OF INVENTION

Technical Problem

However, according to studies by the present inventors, when a printed matter having an inkjet printed layer formed on a resin film is used outdoors, even if it has been primer-treated by the primer composition as described in Patent Document 1, there will be a problem such that adhesion of the inkjet printed layer to the resin film will decrease with time (durability of the printed matter being low).

An object of the present invention is to provide a laminate whereby, when a printed layer is formed by an inkjet printing system, the adhesion of the printed layer can be easily maintained and it is possible to obtain a printed matter excellent in durability; a printed matter using the laminate; and the method for producing the printed matter.

Solution to Problem

The present invention provides a laminate, a printed matter and a method for its production, having the following constructions [1] to [15].

[1] A laminate comprising a film-shaped substrate containing a first fluorinated polymer and a coating layer containing a second fluorinated polymer different from the first fluorinated polymer, which is present in contact directly with one side or each side of the substrate, characterized in that
the visible light transmittance of the substrate is 0% or more than 0%, provided that when it is more than 0%, the visible light transmittance difference represented by the following formula (1), of the laminate, is at most 40%:

Visible light transmittance difference={(the visible light transmittance of the substrate−the visible light transmittance of the laminate)/the visible light transmittance of the substrate}×100(%)     (1)

[2] The laminate according to [1], wherein the visible light transmittance difference is from 0 to 10%.

[3] The laminate according to [1] or [2], wherein the thickness of the substrate is from 25 to 1,000 μm.

[4] The laminate according to any one of [1] to [3], wherein the first fluorinated polymer is at least one type selected from the group consisting of a vinyl fluoride polymer, a vinylidene fluoride polymer, a vinylidene fluoride-hexafluoropropylene copolymer, a tetrafluoroethylene-hexafluoropropylene-vinylidene fluoride copolymer, a tetrafluoroethylene-propylene copolymer, a tetrafluoroethylene-vinylidene fluoride-propylene copolymer, an ethylene-tetrafluoroethylene copolymer, a hexafluoropropylene-tetrafluoroethylene copolymer, an ethylene-hexafluoropropylene-tetrafluoroethylene copolymer, a perfluoro(alkyl vinyl ether)-tetrafluoroethylene copolymer, a chlorotrifluoroethylene polymer, an ethylene-chlorotrifluoroethylene copolymer and a propylene-chlorotrifluoroethylene copolymer.

[5] The laminate according to any one of [1] to [4], wherein the glass transition temperature of the second fluorinated polymer is from 20 to 70° C.

[6] The laminate according to any one of [1] to [5], wherein the second fluorinated polymer is a fluorinated polymer having at least one type of polar group selected from the group consisting of a hydroxy group, a carboxy group, an amido group and a glycidyl group.

[7] The laminate according to [6], wherein the second fluorinated polymer is a fluorinated polymer containing monomer units having said polar group.
[8] The laminate according to any one of [1] to [7], wherein the second fluorinated polymer is a fluorinated polymer containing fluoroolefin units.
[9] The laminate according to any one of [1] to [8], wherein the substrate further contains an ultraviolet blocking agent.
[10] The laminate according to any one of [1] to [9], wherein the coating layer further contains an ultraviolet blocking agent.
[11] The laminate according to any one of [1] to [10], wherein the laminate is a laminate, of which the coating layer surface is to be used for an application to be printed by inkjet printing.
[12] The laminate according to any one of [1] to [11], wherein the laminate is a laminate to be used for an application for use as a film material for a film-structured building.
[13] A printed matter characterized by comprising the laminate as defined in any one of [1] to [12] and a printed layer with a thickness of at least 6 μm directly formed on the coating layer surface of the laminate.
[14] A method for producing a printed matter, characterized by forming a printed layer by applying and curing a curable composition by an inkjet printing system on the coating layer of the laminate as defined in any one of [1] to [12].
[15] The method for producing a printed matter according to [14], wherein the curable composition is an ultraviolet-curable curable composition.

Advantageous Effects of Invention

With the laminate of the present invention, when a printed layer is formed by an inkjet printing system, the adhesion of the printed layer can be easily maintained, and it is possible to obtain a printed matter excellent in durability.

With the printed matter of the present invention, the adhesion of the printed layer can be easily maintained and the durability of the printed matter is excellent.

According to the method for producing a printed matter of the present invention, by an inkjet printing system, it is possible to obtain a printed matter excellent in durability in that adhesion of the printed layer can be easily maintained.

DESCRIPTION OF EMBODIMENTS

In this specification, meanings of the following terms are as follows.

A "unit" in a polymer means a moiety derived from one molecule of a monomer, which is present in a polymer and which constitutes the polymer. Also, one having the structure of a certain unit chemically converted after forming the polymer, may be called a unit.

Further, in some cases, a unit derived from an individual monomer may be referred to by the name having "unit" attached to the monomer's name.

A "visible light transmittance" is a value measured in accordance with JIS R3106:1998 (ISO 9050:1990) "Methods for testing transmittance, reflectance, emissivity, solar radiation heat acquiring efficiency of sheet glasses" by using a spectrophotometer.

A "UV transmittance" is a value measured in accordance with JIS A5759:2008 "Film plates for architectural window glass" by using a spectrophotometer.

In this specification, films and sheets may be referred to as "films", regardless of their thicknesses. An acrylate and a methacrylate are collectively referred to as a "(meth)acrylate", and an acrylamide and a methacrylamide are collectively referred to as a "(meth)acrylamide".

[Laminate]

The laminate of the present invention is a laminate comprising a substrate and a coating layer (hereinafter referred to also as a "layer (A)") present in contact directly with one side or each side of the substrate. The substrate is film-shaped and contains a first fluorinated polymer. Said layer (A) contains a second fluorinated polymer different from said first fluorinated polymer. Since the first fluorinated polymer and the second fluorinated polymer are different, it becomes easy to maintain the adhesion of the substrate and the printed layer.

Figure 1:
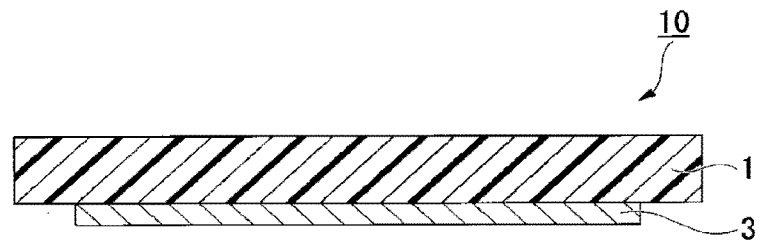
FIG. 1 is a schematic cross-sectional view showing an example of the laminate of the present invention.

FIG. 1 is a schematic cross-sectional view showing an example of the laminate of the present invention. The laminate 10 of this example comprises a substrate 1 and a layer (A) 3 in contact directly with one side of the substrate 1.

Figure 2:
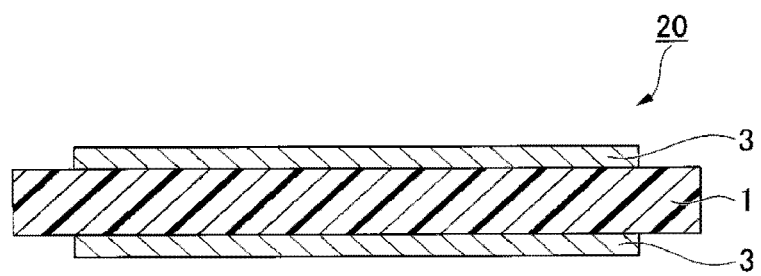
FIG. 2 is a schematic cross-sectional view showing another example of the laminate of the present invention.

FIG. 2 is a schematic cross-sectional view showing another example of the laminate of the present invention. The laminate 20 of this example comprises a substrate 1 and a layer (A) 3 in contact directly with each side of the substrate 1.

Here, examples are shown in which a layer (A) is formed at a part of the substrate surface (at a part of the lower surface in FIG. 1, and at a part of each of the upper and lower surfaces in FIG. 2), but a layer (A) may be formed at the entire surface on one side or each side of the substrate.

The ratio of the area of the layer (A) to the area of the substrate on one side of the substrate (hereinafter referred to also as the "area ratio"), i.e. the proportion of the area covered by the layer (A) in the area of the substrate, is preferably at least 0.1%. The upper limit of the area ratio is not particularly limited and may be 100%.

Further, the layer (A) is, usually, formed almost over the entire surface on one side of the substrate, for example, at an area ratio of from 90% to 100%, but it may be formed partially in e.g. a dot pattern or a stripe pattern.

(Visible Light Transmittance Difference)

In the present invention, the visible light transmittance of the substrate is 0% or more than 0%, and when it is more than 0%, in the laminate of the present invention, the visible light transmittance difference represented by the following formula (1) is at most 40%.

Visible light transmittance difference={(the visible light transmittance of the substrate−the visible light transmittance of the laminate)/the visible light transmittance of the substrate}×100(%)     (1)

Preferred visible light transmittances of the substrate and the laminate are, respectively, as described later.

Here, the visible light transmittance of the laminate is one to mean the visible light transmittance at the portion where the layer (A) is present on the substrate.

The visible light transmittance difference is an index for the visible light transmittance of the layer (A). The smaller the visible light transmittance difference, the higher the visible light transmittance of the layer (A).

The layer (A) is a layer that functions as a primer layer, and the higher the visible light transmittance of the layer (A), the more useful as a primer layer. That is, the laminate of the present invention will be made to be a printed matter, as a printed layer is formed on the layer (A). Further, the layer (A) is usually formed also at a portion where a printed layer is not formed on the substrate. In a case where a printed layer is formed on the side opposite to the viewing side of the laminate, i.e. in a case where the printed layer is to be viewed through the laminate, the higher the visible light transmittance of the layer (A), the less likely the color tone of the printed layer be impaired. On the other hand, in a case where the printed layer is formed on the viewing side of the laminate, i.e. in a case where the layer (A) is disposed on the viewing side of the substrate, the higher the visible light transmittance of the layer (A), the less likely the color tone of the substrate be impaired.

The visible light transmittance difference is preferably at most 10%, particularly preferably at most 5%.

The lower limit of the visible light transmittance difference is not particularly limited and may be 0%.

(Visible Light Transmittance of the Laminate)

In a case where the printed layer is to be viewed through the laminate, the visible light transmittance of the laminate of the present invention is preferably at least 60%, more preferably at least 75%, particularly preferably at least 80%.

In a case where it is not necessary to let the printed layer be viewed through the laminate, the visible light transmittance of the laminate of the present invention is not particularly limited.

The case where it is not necessary to let the printed layer be viewed through the laminate, may, for example, be a case where in a film-structured building, a printed matter is arranged so that the printed layer is on the indoor side and so that the printed layer is to be viewed from the indoor side. For example, the arrangement may be such that when the printed matter is viewed from the outside of the film-structured building, it is white or silver colored, but when the printed matter is viewed from the inside of the film-structured building, the printed pattern (geometric pattern or the like) is to be visible. Further, also in a case where a color film of e.g. white color is used as the substrate, the printed pattern (geometric pattern or the like) is to be visible from the inside.

(UV Transmittance of the Laminate)

The UV transmittance of the laminate of the present invention is not particularly limited, but is preferably at most 80%, particularly preferably at most 40% in a case where the printed layer is disposed on the side of the laminate opposite to the incident side of sunlight. When the UV transmittance of the laminate is at most the above upper limit value, UV will be blocked by the laminate, whereby it is possible to prevent that the resin component in the printed layer undergoes photodecomposition by UV, that a pigment undergoes photodecomposition, or that a dye undergoes sublimation. Therefore, adhesion durability of the printed layer will be more excellent, and it is further possible to prevent the color change with time of the printed layer.

The UV transmittance of the laminate can be adjusted by incorporating a UV blocking agent in the substrate, or by incorporating a UV blocking agent to the layer (A).

(Substrate)

The visible light transmittance of the substrate is at least 0%. In the case of letting the printed layer be viewed through the laminate, it is preferably at least 40%, more preferably at least 60%, further preferably at least 75%, particularly preferably at least 85%. In a case where it is not necessary to let the printed layer be viewed through the laminate, the visible light transmittance of the substrate is not particularly limited.

The UV transmittance of the substrate is not particularly limited, but is preferably at most 80%, particularly preferably at most 40%, in a case where the printed layer is provided on the side of the laminate opposite to the incident side of sunlight. When the UV transmittance of the substrate is at most the above upper limit value, adhesion durability of the printed layer, and the effect to prevent the color change with time of the printed layer, will be more excellent.

The thickness of the substrate is preferably from 25 to 1,000 µm, particularly preferably from 100 to 500 µm. When the thickness of the substrate is at least the lower limit value in the above range, the mechanical strength of the substrate will be excellent. When the thickness of the substrate is at most the upper limit value in the above range, optical transparency will be excellent, and it will be easy to handle the film. Also, workability and stretchability of the laminate or the printed matter will be excellent.

From such a viewpoint that adhesion to the layer (A) will be more excellent, the substrate is preferably such that the surface treatment for increasing the surface tension is applied to the side on which the layer (A) will be laminated. By applying the surface treatment, polar groups (carboxy groups, hydroxy groups, carbonyl, etc.) will be formed on the surface of the substrate, to improve the adhesion between the substrate and the layer (A). Particularly, in a case where the second fluorinated polymer in the layer (A) has polar groups, the polar groups at the surface of the substrate and the polar groups in the layer (A) will form chemical bonds to further improve the adhesion.

As the surface treatment, electrical surface treatment such as corona discharge treatment, plasma discharge treatment, etc., metal sodium treatment, mechanical graining treatment, excimer laser treatment, etc. may be mentioned, and from such a viewpoint that the processing speed is high, and no washing after treatment is required, electrical surface treatment, particularly corona discharge treatment, is preferred.

The surface tension of the substrate is preferably at least 0.035 N/m, particularly preferably at least 0.04 N/m. When the surface tension of the substrate is at least the lower limit value in the above range, the adhesion between the substrate and the layer (A) will be more excellent.

The substrate contains a first fluorinated polymer. Thus, the weather resistance of the substrate is excellent. Further, when a printed matter is made by forming a printed layer on the laminate, durability of the adhesion between the substrate and the layer (A) will be excellent. Further, durability of the adhesion between the printed layer and the layer (A) will also be excellent. This is because there is no possibility that a decomposition product of the substrate caused by light or water, will chemically degrade the layer (A).

The content of the first fluorinated polymer in the substrate is preferably at least 60 mass %, more preferably at least 70 mass %, particularly preferably at least 90 mass %, in the total mass of the substrate. When the content of the first fluorinated polymer is at least the lower limit value in the above range, the weather resistance of the substrate, durability of the adhesion between the substrate and the layer (A), and durability of the adhesion between the layer (A) and the printed layer, will be further excellent.

The first fluorinated polymer in the substrate may be composed of only one type of fluorinated polymer, or may be composed of two or more types of fluorinated polymers.

The substrate may be single layered or multilayered.

In the case of being multilayered, it may be one wherein a plurality of layers each containing a fluorinated polymer are stacked, or one wherein a layer containing a fluorinated polymer and a layer not containing a fluorinated polymer are laminated. However, the layer in contact directly with the layer (A) contains a fluorinated polymer. For example, in a case where the layer (A) is to be laminated on one side of the substrate, the substrate may be one having a layer containing a fluorinated polymer and a layer not containing a fluorinated polymer, laminated on the side opposite to the side where the layer (A) is to be laminated. As the layer containing no fluorinated polymer, a layer made of a resin such as an acrylic resin, a silicone resin, etc. may be mentioned.

<First Fluorinated Polymer>

The first fluorinated polymer is not particularly limited so long as it can be formed into a film.

The fluorine atom content of the first fluorinated polymer is preferably at least 45 mass %, more preferably at least 50 mass %, particularly preferably at least 55 mass %. When the fluorine atom content is at least the lower limit value in the above range, the weather resistance, stain resistance, chemical resistance and non-tackiness of the substrate will be further excellent, and particularly non-tackiness and stain resistance will be excellent.

As the first fluorinated polymer, preferred is a fluorinated polymer, of which the stress to 10% elongation is at least 10 MPa. The value of the stress to 10% elongation is obtainable by the method stipulated in JIS K7127:1999 (Plastics-Test method for tensile characteristics-Part 3: Test conditions for films and sheets). Using Dumbbell 5 as a test piece, the calculation is made by dividing the tension at the time of stretching at a tensile rate of 200 mm/min. by the cross-sectional area of the original film. The stress to 10% elongation does not depend on the thickness of the film, and highly depends on the composition of the fluorinated polymer. When the stress to 10% elongation is at least 10 MPa, the polymer will be excellent also in snow accumulation resistance and wind pressure resistance.

The first fluorinated polymer is preferably at least one type selected from the group consisting of a vinyl fluoride polymer (hereinafter referred to also as "PVF"), a vinylidene fluoride polymer (hereinafter referred to also as "PVDF"), a vinylidene fluoride-hexafluoropropylene copolymer, a tetrafluoroethylene-hexafluoropropylene-vinylidene fluoride copolymer (hereinafter referred to also as "THV"), a tetrafluoroethylene-propylene copolymer, a tetrafluoroethylene-vinylidene fluoride-propylene copolymer, an ethylene-tetrafluoroethylene copolymer (hereinafter referred to also as "ETFE"), a hexafluoropropylene-tetrafluoroethylene copolymer (hereinafter referred to also as "FEP"), an ethylene-hexafluoropropylene-tetrafluoroethylene copolymer (hereinafter referred to also as "EFEP"), a perfluoro(alkyl vinyl ether)-tetrafluoroethylene copolymer (hereinafter referred to also as "PFA"), a chlorotrifluoroethylene polymer (hereinafter referred to also as "PCTFE"), an ethylene-chlorotrifluoroethylene copolymer (hereinafter referred to also as "ECTFE") and a propylene-chlorotrifluoroethylene copolymer.

The perfluoro(alkyl vinyl ether) is the same as one which will be mentioned in the second fluorinated polymer as described later, and the preferred embodiments thereof are also the same.

As the first fluorinated polymer, ETFE is particularly preferred from such a viewpoint that the weather resistance and tear propagation strength are high.

<Other Components>

The substrate may contain other components (such as non-fluorinated resins, known additives, etc.) within a range not to impair the effects of the present invention.

The non-fluorinated resins may, for example, be polycarbonate, polyethylene, polypropylene, etc.

The additives may, for example, be colored inorganic pigments represented by titanium oxide (white), aluminum cobalt oxide (blue), iron oxide (red), etc. The substrate may, with its color, often represent the image of a building such as a film-structured facility, and therefore, one having coloring applied by a colored inorganic pigment may sometimes be used. Further, in many cases, the colored inorganic pigment may be one having the transmittance of the UV wavelength range reduced by absorption or scattering. In a case where a printed layer is disposed on the side of the substrate opposite to the incident side of sunlight, when such a colored inorganic pigment is incorporated in the substrate, it is possible to prevent light deterioration of the resin components and the pigment in the printed layer.

The content of the colored inorganic pigment in the substrate is suitably selected depending on the desired visible light transmittance of the substrate. For example, it is preferably from 0.01 to 0.5 mass % in the total mass of the substrate.

As another additive, a UV blocking agent may be mentioned. When the substrate further contains a UV blocking agent, it is possible to reduce the UV transmission while maintaining a high visible light transmittance. If the UV transmittance of the substrate is low, it is possible to prevent light degradation of resin components and pigment in the printed layer in a case where the printed layer is disposed on the side of the substrate opposite to the incident side of sunlight.

The UV blocking agent may suitably be selected from known UV blocking agents in consideration of the wavelength of UV to be blocked, etc. For example, inorganic UV blocking agents such as metal oxide particles, titanium nitride, hexaboride compounds, etc., organic UV blocking agents of e.g. benzophenone type, triazine type, etc. may be mentioned. The metal oxide particles may, for example, be cerium oxide particles, zinc oxide particles, titanium oxide particles, iron oxide particles, etc. The metal oxide particles may have a coating layer. The coating layer may, for example, a silicon oxide layer. As the metal oxide particles having such a coating layer, those described in Japanese Patent No. 5454472 may, for example, be mentioned. As the UV blocking agent to be contained in the substrate, one type may be used alone, or two or more types may be used in combination.

In a case where the substrate contains a UV blocking agent, the content of the UV blocking agent in the substrate is preferably such an amount that the UV transmittance of the substrate would be at most the above-mentioned preferred upper limit value. This amount is suitably selected depending on the type of the UV blocking agent. For example, it is preferably from 0.1 to 3 mass % in the total mass of the substrate.

(Layer (A))

As the laminate has the layer (A), when a printed matter is made by forming a printed layer on the laminate of the present invention, adhesion between the substrate and the printed layer, and the durability of this adhesion, will be excellent.

The layer (A) has light transmittance. The visible light transmittance of the layer (A) is such a value that the above-mentioned visible light transmittance difference would be at most the above-mentioned upper limit value.

The mass per unit area of the layer (A) (provided that if the layer (A) is provided on each side of the substrate, the mass is a value per one side) is preferably from 0.5 to 20 g/m$^2$, particularly preferably from 2 to 10 g/m$^2$. When the mass per unit area of the layer (A) is at least the lower limit value in the above range, adhesion between the printed layer and the layer (A) will be more excellent. When the mass per unit area of the layer (A) is at most the upper limit value in the above range, the layer (A) is likely to follow a deformation (stretching or bending) of the substrate, whereby the layer (A) is less likely to be peeled from the substrate.

To the surface of the layer (A) (the surface on which a printed layer is to be formed), surface treatment may be applied to increase the surface tension. The layer (A) is excellent in adhesion to the printed layer, but by applying the surface treatment, the adhesion can be made to be more excellent.

As the surface treatment, the same treatment as the surface treatment of the substrate may be mentioned.

The surface tension of the layer (A) is preferably at least 0.04 N/m, particularly preferably at least 0.05 N/m. When the surface tension of the layer (A) is at least the lower limit value in the above range, adhesion between the printed layer and the layer (A) will be more excellent.

<Coating Layer>

The layer (A) contains a second fluorinated polymer different from the first fluorinated polymer. The coating layer may contain components (non-fluorinated resins, known additives, etc.) other than the fluorinated polymer, to the extent not to impair the effects of the present invention.

<Second Fluorinated Polymer>

The glass transition temperature of the second fluorinated polymer is preferably from 20 to 70° C., particularly preferably from 20 to 45° C. When the laminate of the present invention is made to be a printed matter, there may be a case where the layer (A) becomes to be the outermost layer. If the glass transition temperature of the second fluorinated polymer is at least the lower limit value in the above range, the layer (A) does not have tackiness at room temperature, such being preferred. If the glass transition temperature of the second fluorinated polymer is at most the upper limit value in the above range, it becomes easier to maintain the adhesion between the substrate and the printed layer.

The glass transition temperature (Tg) of the fluorinated polymer means an intermediate glass transition temperature measured by a differential scanning calorimetry (DSC) method.

The second fluorinated polymer typically contains fluorinated monomer units.

The fluorinated monomer may be a fluoroolefin, a perfluoro(alkyl vinyl ether), a perfluoro unsaturated cyclic ether, etc.

The fluoroolefin may be vinyl fluoride, vinylidene fluoride, trifluoroethylene, chlorotrifluoroethylene, tetrafluoroethylene, hexafluoropropylene, perfluorobutene-1, perfluorohexene-1, perfluorononene-1, a (perfluoroalkyl)ethylene etc.

The (perfluoroalkyl)ethylene is a fluoroolefin represented by CH$_2$=CH—R$^f$ (wherein R$^f$ is a perfluoroalkyl group). The (perfluoroalkyl)ethylene may be (perfluoromethyl)ethylene, (perfluorobutyl)ethylene, etc.

The number of carbon atoms in the fluoroolefin is preferably at most 10. The number of carbon atoms in the fluoroolefin other than the (perfluoroalkyl)ethylene is particularly preferably 2 or 3. The number of carbon atoms in the (perfluoroalkyl)ethylene is particularly preferably from 3 to 8.

The perfluoro(alkyl vinyl ether) may be perfluoro(methyl vinyl ether), perfluoro(ethyl vinyl ether), perfluoro(propyl vinyl ether), perfluoro(heptyl vinyl ether), etc. The number of carbon atoms in the perfluoro(alkyl vinyl ether) is preferably at most 10, particularly preferably at most 6. The lower limit for the number of carbon atoms is 3.

The perfluoro unsaturated cyclic ether may be 2,2-bis(trifluoromethyl)-4,5-difluoro-1,3-dioxole, etc.

The fluorinated monomer units contained in the second fluorinated polymer may be one type, or two or more types.

The second fluorinated polymer preferably contains fluoroolefin units, from the viewpoint of excellent weather resistance. The second fluorinated polymer may further contain fluorinated monomer units other than fluoroolefin units, or may contain monomer units having no fluorine atom.

The second fluorinated polymer preferably has polar groups, from the viewpoint of excellent adhesion to both the substrate and the printed layer to be formed from the ink (e.g. the curable composition to be described later) to be used in inkjet printing.

The polar groups are preferably at least one type selected from the group consisting of hydroxy groups, carboxy groups, amido groups and glycidyl groups, particularly preferably hydroxy groups.

The polar group may be contained in the main chain terminal of the second fluorinated polymer, may be contained in a side chain group, or may be contained in both of them.

The second fluorinated polymer preferably contains units of a monomer having a polar group. The units of a monomer having a polar group contained in the second fluorinated polymer may be one type, or two or more types.

The monomer having a polar group is typically a monomer having no fluorine atom.

The monomer having a polar group may be a monomer having a hydroxy group, a monomer having a carboxy group, a monomer having an amide group, a monomer having a glycidyl group, etc.

The monomer having a hydroxy group may be allyl alcohol, a hydroxyalkyl vinyl ether, a hydroxyalkyl allyl ether, a hydroxyalkyl (meth)acrylate, a hydroxyalkyl carboxylic acid vinyl ester, a hydroxyalkyl allyl ester, etc.

The hydroxyalkyl vinyl ether may be 2-hydroxyethyl vinyl ether, 3-hydroxypropyl vinyl ether, 4-hydroxybutyl vinyl ether, 4-hydroxycyclohexyl vinyl ether, etc.

The hydroxyalkyl allyl ether may be 2-hydroxyethyl allyl ether, 3-hydroxypropyl allyl ether, 4-hydroxybutyl allyl ether, 4-hydroxycyclohexyl allyl ether, etc.

The hydroxyalkyl (meth)acrylate may be 2-hydroxyethyl (meth)acrylate, etc.

The hydroxyalkyl carboxylic acid vinyl ester may be vinyl hydroxyacetate, vinyl hydroxyisobutyrate, vinyl hydroxypropionate, vinyl hydroxybutyrate, vinyl hydroxyvalerate, vinyl hydroxycyclohexyl carboxylate, etc.

The hydroxyalkyl allyl ester may be hydroxyethyl allyl ester, hydroxypropyl allyl ester, hydroxybutyl allyl ester, hydroxyisobutyl allyl ester, hydroxycyclohexyl allyl ester, etc.

The monomer having a carboxy group may be acrylic acid, methacrylic acid, a carboxyalkyl allyl ester, etc.

The monomer having an amide group may be (meth)acrylamide, N-methyl (meth)acrylamide, etc.

The monomer having a glycidyl group may be glycidyl allyl ether, glycidyl (meth)acrylate, etc.

A monomer unit having a polar group may be one converted to a unit having another polar group by reacting the unit having a polar group with a specific compound. For example, a monomer unit having a hydroxy group can be converted to a unit having a carboxy group by reacting it with a divalent carboxylic acid anhydride such as succinic anhydride.

The second fluorinated polymer may have monomer units other than the fluorinated monomer units and the monomer units having polar groups. Other monomer units to be contained in the second fluorinated polymer may be one type, or two or more types.

Other monomers are monomers having no fluorine atom or polar group.

Such other monomers may be a vinyl ether, an allyl ether, a carboxylic acid vinyl ester, a carboxylic acid allyl ester, an olefin, an unsaturated carboxylic acid ester, etc.

The vinyl ether may be a cycloalkyl vinyl ether (cyclohexyl vinyl ether, etc.), an alkyl vinyl ether (nonyl vinyl ether, 2-ethylhexyl vinyl ether, hexyl vinyl ether, ethyl vinyl ether, n-butyl vinyl ether, tert-butyl vinyl ether, etc.), etc.

The allyl ether may be an alkyl allyl ether (ethyl allyl ether, hexyl allyl ether, etc.), etc.

The number of carbon atoms in the cycloalkyl group in the cycloalkyl vinyl ether is preferably from 3 to 20. The number of carbon atoms in the alkyl group in the alkyl vinyl ether or the alkyl allyl ether is preferably from 1 to 20.

The carboxylic acid vinyl ester may, for example, be a vinyl ester of a $C_{2-15}$ carboxylic acid (acetic acid, butyric acid, pivalic acid, benzoic acid, propionic acid, etc.). As a vinyl ester of a carboxylic acid having a branched alkyl group, VeoVa 9 (registered trademark) or VeoVa 10 (registered trademark) manufactured by Shell Chemicals, may be used.

The carboxylic acid allyl ester may, for example, be an allyl ester of a $C_{2-15}$ carboxylic acid (acetic acid, butyric acid, pivalic acid, benzoic acid, propionic acid, etc.).

The olefin is preferably a $C_{2-4}$ olefin, and ethylene, propylene, isobutylene, etc. may be mentioned.

The unsaturated carboxylic acid ester may be methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-amyl (meth)acrylate, isoamyl (meth)acrylate, n-hexyl (meth)acrylate, isohexyl (meth)acrylate, 2-ethylhexyl (meth)acrylate, lauryl (meth)acrylate, etc.

In a case where the second fluorinated polymer has no polar group, specific examples of the second fluorinated polymer may be PVF, PVDF, THV, ETFE, FEP, EFEP, PFA, PCTFE, ECTFE, a tetrafluoroethylene-2,2-bis(trifluoromethyl)-4,5-difluoro-1,3-dioxole copolymer, a copolymer containing fluoroolefin units and monomer units having polar groups, etc.

As the second fluorinated polymer, at least one type selected from the group consisting of the following copolymer (A1) and copolymer (A2) is preferred from such a viewpoint that the optical characteristics are less likely to change even in long-term exposure, and from the viewpoint of excellent adhesion to both the substrate and the printed layer to be formed from an ink used in inkjet printing.

Copolymer (A1): a copolymer comprising tetrafluoroethylene units, hexafluoropropylene units and vinylidene fluoride units.

Copolymer (A2): a copolymer comprising fluoroolefin units and monomer units having hydroxy groups (but excluding the copolymer (A1)).

The copolymer (A1) is THV. The copolymer (A1) may be conventional THV having no polar group, or may be THV having polar groups. From the viewpoint of excellent adhesiveness of the printed layer, THV having polar groups is preferred, and THV containing monomer units having polar groups is particularly preferred.

THV containing monomer units having polar groups may be a copolymer comprising tetrafluoroethylene units, hexafluoropropylene units, vinylidene fluoride units and monomer units having hydroxy groups, a copolymer comprising tetrafluoroethylene units, hexafluoropropylene units, vinylidene fluoride units and monomer units having carboxy groups, etc.

The copolymer (A1) may further contain the above-described other monomer units.

In the total of tetrafluoroethylene units, hexafluoropropylene units and vinylidene fluoride units in the copolymer (A1), it is preferred that the content of tetrafluoroethylene units is from 30 to 75 mol %, the content of hexafluoropropylene units is from 15 to 55 mol %, and the content of vinylidene fluoride units is from 5 to 50 mol %.

The content of monomer units having polar groups in the copolymer (A1) is preferably from 0.5 to 25 mol %, particularly preferably from 2 to 10 mol %, in all units of THV. When the content of monomer units having polar groups is at least the lower limit value in the above range, adhesion between the layer (A) and the substrate or the printed layer will be more excellent. When the content of monomer units having polar group is at most the upper limit value in the above range, flexibility of the layer (A) will be excellent.

Commercial products of the copolymer (A1) may, for example, be THV (trade name) series (THV200, THV220, THV221, THV415, THV500, etc.) (manufactured by 3M), etc.

The copolymer (A2) preferably further contains the above-mentioned other monomer units, since it is thereby possible to further impart other characteristics (solvent-solubility, optical transparency, gloss, hardness, flexibility, pigment dispersibility, etc.).

As the combination of monomers to constitute the copolymer (A2), the following combination (1) is preferred, and the following combination (2) or (3) is particularly preferred, from such a viewpoint that the optical properties of the layer (A) are less likely to decrease for a long time, from the viewpoint of excellent adhesion between the layer (A) and the substrate or printed layer, and from the viewpoint of excellent flexibility of the layer (A).

Combination (1)

Fluoroolefin: tetrafluoroethylene or chlorotrifluoroethylene,

Monomer having a hydroxy group: a hydroxyalkyl vinyl ether,

Other monomers: at least one type selected from the group consisting of a cycloalkyl vinyl ether, an alkyl vinyl ether and a carboxylic acid vinyl ester.

Combination (2)

Fluoroolefin: tetrafluoroethylene,

Monomer having a hydroxy group: a hydroxyalkyl vinyl ether,

Other monomers: at least one type selected from the group consisting of tert-butyl vinyl ether and a carboxylic acid vinyl ester.

Combination (3)

Fluoroolefin: chlorotrifluoroethylene,

Monomer having a hydroxy group: a hydroxyalkyl vinyl ether,

Other monomers: at least one type selected from the group consisting of tert-butyl vinyl ether and a carboxylic acid vinyl ester.

The content of fluoroolefin units in the copolymer (A2) is preferably from 30 to 70 mol %, particularly preferably from 40 to 60 mol %, in all units of the copolymer (A2). When the content of fluoroolefin units is at least the lower limit value in the above range, the optical properties of the layer (A) are further less likely to decrease over a long period of time. When the content of fluoroolefin units is at most the upper limit value in the above range, adhesion between the layer (A) and the substrate or printed layer will be more excellent.

The content of monomer units having hydroxy groups in the copolymer (A2) is preferably from 0.5 to 20 mol %, particularly preferably from 1 to 15 mol %, in all units of the copolymer (A2). When the content of monomer units having hydroxy groups is at least the lower limit value in the above range, adhesion between the layer (A) and the substrate or printed layer will be more excellent. When the content of monomer units having hydroxy groups is at most the upper limit value in the above range, flexibility of the layer (A) will be excellent.

The content of other monomer units in the copolymer (A2) is preferably from 20 to 60 mol %, particularly preferably from 30 to 50 mol %, in all units of the copolymer (A2). When the content of other monomer units is at least the lower limit value in the above range, flexibility of the layer (A) will be excellent. When the content of other monomer units is at most the upper limit value in the above range, adhesion between the layer (A) and the substrate or printed layer will be more excellent.

Commercial products of the copolymer (A2) may, for example, be LUMIFLON (registered trademark) series (LF200, LF100, LF710, LF600, etc.) (manufactured by Asahi Glass Company, Limited), ZEFFLE (registered trademark) GK series (GK-500, GK-510, GK-550, GK-570, GK-580, etc.) (manufactured by Daikin Industries, Ltd.), FLUONATE (registered trademark) series (K-700, K-702, K-703, K-704, K-705, K-707, etc.) (manufactured by DIC Corporation), ETERFLON series (4101, 41011, 4102, 41021, 4261A, 4262A, 42631, 4102A, 41041, 41111, 4261A, etc.) (manufactured by Eternal Chemical), etc.

<Other Components>

In a case where the second fluorinated polymer is a fluorinated polymer having polar groups, as described above, from the viewpoint of excellent adhesion to both the printed layer and the substrate, it is preferred that the fluorinated polymer in the layer (A) is in a state having polar groups. Therefore, so that polar groups will not disappear at the time of forming the layer (A), it is preferred that the coating liquid does not contain a component reactive with the polar groups. Moreover, even after forming the layer (A), it is preferred that a component reactive with the polar groups is not contained in the layer (A).

The component reactive with the polar groups may be a compound having a reactive group capable of being reacted with the polar groups. A fluorinated polymer having polar groups is known to be used in combination with a curing agent as a component of a curable coating material. For example, a hydroxy group-containing fluorinated polymer is known to be a coating material component in order to form a cured coating film in combination with a compound (a curing agent or the like) reactive with a hydroxy group, having an isocyanate group or a blocked isocyanate group. Thus, a layer (A) formed by using a component such as a curing agent to let the polar groups disappear, or a layer (A) containing a component to let the polar groups disappear, is likely to lower the adhesion to the printed layer or the substrate, based on the presence of the polar groups.

On the other hand, the layer (A) may contain components other than the component reactive with the polar groups. As such other components, a non-fluorinated resin, known additives, etc. may be mentioned.

The non-fluorinated resin may, for example, be a polyester resin, etc.

The additives may, for example, be a colorant, an antioxidant, an anti-sagging agent, a UV blocking agent, a light stabilizer, a surface modifier, a slip agent, etc.

As the colorant, a pigment, a dye, etc. may be mentioned. From the viewpoint of excellent weather resistance, a pigment is preferred.

As the pigment, a pigment to be used usually in a gravure ink, may be used, and, for example, a coloring pigment such as an organic pigment, an inorganic pigment, etc., an aluminum paste, a glitter pigment such as mica, pearl, etc. may be mentioned.

The UV blocking agent may be an inorganic UV blocking agent, an organic UV blocking agent, etc.

The inorganic UV blocking agent may, for example, be an inorganic oxide such as cerium oxide, titanium oxide, zinc oxide, iron oxide, barium titanate, etc. The organic UV blocking agent may be a triazine-type UV blocking agent, a benzophenone-type UV blocking agent, etc. Among these, from the viewpoint of good resistance to UV, a triazine-type UV blocking agent is preferred.

As the triazine-type UV blocking agent, a triazine derivative known as a UV blocking agent, may be used, and it is available from commercial products.

As preferred triazine-type UV blocking agents, the following hydroxyphenyl triazine-type UV blocking agents may be mentioned.

2-(2-Hydroxy-4-[1-octyloxycarbonylethoxy]phenyl)-4,6-bis(4-phenylphenyl)-1,3,5-triazine (as commercial product, trade name: TINUVIN 479, manufactured by Ciba Japan Co., Ltd. (since Mar. 1, 2010, BASF Japan Ltd., the same applies hereinafter).

2,4-Bis[2-hydroxy-4-butoxyphenyl]-6-(2,4-dibutoxyphenyl)-1,3,5-triazine (as commercial product, trade name: TINUVIN 460, manufactured by Ciba Japan Co., Ltd.).

2-[4-[(2-Hydroxy-3-(2'-ethyl)hexyloxy]-2-hydroxyphenyl]-4,6-bis(2,4-dimethylphenyl)-1,3,5-triazine (as commercial product, trade name: TINUVIN 405, manufactured by Ciba Japan Co., Ltd.).

Trade name: TINUVIN 477, manufactured by Ciba Japan Co., Ltd. This product is one described on page 10 in "Catalog for additives for coating materials" of Ciba Japan Co., Ltd. (Pub. No. CJ-005, issued in March 2008), and is known to be a mixture of about 80% of a hydroxyphenyl triazine-type UV blocking agent with a structure not published, and about 20% of 1-methoxy-2-propyl acetate with a structure not published.

Trade name: TINUVIN 400, manufactured by Ciba Japan Co., Ltd. This product is one described on page 7 of the above-mentioned "Catalog for additives for coating materials", and is known to be a reaction product of 2-(4,6-bis(2, 4-dimethylphenyl)-1,3,5-triazin-2-yl)-5-hydroxyphenyl and a [($C_{10-16}$, mainly $C_{12-13}$, alkyloxy)methyl]oxirane.

As preferred triazine-type UV blocking agents other than the hydroxyphenyl triazine-type UV blocking agents, the following compounds may be mentioned.

2-[4,6-Bis(2,4-dimethylphenyl)-1,3,5-triazin-2-yl]-5-(octyloxy)phenol (as commercial product, trade name: CYASORB UV-1164, manufactured by SUN CHEMICAL COMPANY LTD).

2-[2,6-di(2,4-xylyl)-1,3,5-triazin-2-yl]-5-octyloxyphenol (as commercial product, trade name: KEMISORB 102, manufactured by Chemipro Kasei Kaisha, Ltd.).

<Contents of the Respective Components in the Coating Layer>

The content of the fluorinated polymer in the layer (A) is preferably at least 50 mass %, particularly preferably from 60 to 100 mass %, to the total mass of the layer (A). When the content of the second fluorinated polymer is at least the above lower limit value, durability of the adhesion between the layer (A) and the substrate or printed layer will be more excellent.

Further, in a case where the layer (A) contains other components, the content thereof is preferably less than 50 mass % to the total mass of the layer (A), from the viewpoint of excellent durability of the adhesion.

In a case where the layer (A) contains a UV blocking agent as another component, the content thereof is preferably in such an amount that the UV transmittance of the laminate would be at most the above-mentioned preferred upper limit value. If the content of the UV blocking agent is too much, it may adversely affect the adhesion to the substrate, and therefore, it is preferred to set the content of the UV blocking agent within a range not to bring about such an inconvenience.

From these viewpoints, the content of the UV blocking agent is preferably from 10 to 50 parts by mass to 100 parts by mass of the second fluorinated polymer, although it may differ depending on the thickness of the layer (A).

In a case where the layer (A) contains, as other components, components other than the colorant and the UV blocking agent, the content of such components is preferably from 0.01 to 40 parts by mass per 100 parts by mass of the second fluorinated polymer.

(Method for Producing Laminate)

The laminate of the present invention can be produced, for example, by forming a layer (A) on one side or each side of the substrate.

As the substrate, a commercially available film may be used, or a film produced by a known production method may be used. As a method for producing a film, for example, an extrusion molding method, a calendar molding method, a solution casting method, etc. may be mentioned.

The side of the substrate on which the layer (A) is to be formed, is preferably subjected to the above-mentioned surface treatment.

The method for forming the layer (A) may, for example, be a method of applying a coating liquid on a substrate, followed by drying to form the layer (A). Here, the coating liquid comprises the above-mentioned layer (A) forming components such as the second fluorinated polymer, and a solvent.

The solvent may be one capable of dissolving or dispersing the second fluorinated polymer, and, for example, toluene, xylene, methyl ethyl ketone, ethyl acetate, etc. may be mentioned.

The method for applying the coating liquid is not particularly limited, and any of various wet coating methods may be employed. The wet coating methods may, for example, be a printing method such as gravure printing, screen printing, inkjet printing, offset printing, etc., a coating method such as a spray coating method, a die coating method, a spin coating method, etc.

As the drying conditions after coating, preferred are conditions of from 40 to 150° C. for from about 2 to 20 seconds, in order to volatilize the solvent and to improve the adhesion between the coating film and the substrate.

As a preferred embodiment of the laminate of the present invention, an embodiment may be mentioned in which the first fluorinated polymer is ETFE, and the second fluorinated polymer is at least one type selected from the group consisting of the above-mentioned copolymer (A1) and copolymer (A2).

In the laminate of the present invention, the layer (A) is in contact directly on one side or each side of the substrate, and therefore, at the time of forming a printed layer on the layer (A) by inkjet printing, it is possible to obtain a printed matter wherein the adhesion of the printed layer is excellent. Further, the layer (A) has such a visible light transmittance that the above-mentioned visible light transmittance difference becomes to be at most 40%, whereby when made in a printed matter, the inherent color tone, etc. of the substrate and printed layer tend to be less likely to be impaired.

Accordingly, the laminate of the present invention is useful as a laminate for use in an application where the layer (A) surface is printed by inkjet printing.

The laminate of the present invention is useful as a laminate to be employed for an application to be used outdoors, particularly for an application to be used as a film material for a film-structured building.

By printing characters (e.g. the owner's name of the film-structured building or its logo), abstract design images, patterns such as photographs, etc. on a film material to be used outdoors, for example, on a film material of a film-structured building, it is possible to impart message properties or design properties. From the viewpoint of costs, such printing may not be accomplished by gravure printing or screen printing, but may be accomplished by inkjet printing.

In the case of using a film material having a printed layer formed by inkjet printing outdoors, the biggest problem is adhesion of the printed layer. This adhesion is judged by a peel test using a cellophane tape, but even after a weathering test, sufficient adhesion must be ensured. Further, in a film-structured building, etc., the film material is subjected to stretching and shrinkage, and repeated bending by wind, rain, snow, a pressure change inside of the film-structured building, the internal pressure of the air film, etc., and therefore, the printed layer is required to have adhesiveness to follow such a deformation of the film material.

The printed layer to be formed on the layer (A) of the laminate of the present invention is excellent in adhesion. Further, it is excellent also in durability of the adhesion, and sufficiently excellent adhesion will be maintained even after the weathering test. Further, since the layer (A) contains a second fluorinated polymer, it has excellent follow-up properties to deformation of the substrate. Accordingly, even if deformation occurs repeatedly to the substrate by e.g. wind, pressure changes in the inside of the film-structured building, etc., the layer (A) is hardly peeled off from the substrate. A layer made of a curable composition tends to be difficult to follow the deformation of the substrate due to the shrinkage stress, and is likely to undergo interfacial peeling depending upon the application.

Particularly, in a case where the film constituting the substrate contains a UV blocking agent, or the layer (A) contains a UV blocking agent, the laminate has a UV cutting function. In such a case, in the outdoors, if the laminate of the present invention is disposed on the incident side of sunlight than the printed layer, it is possible to prevent incidence of UV to the printed layer, or deterioration (color change, etc.) with time of the printed layer by such incidence of UV.

The film-structured building may be an outdoor exhibition hall, a sports facility (e.g. a swimming pool, a gymnasium, a tennis court, a soccer field, an athletic field, etc.), an agriculture house, etc. Specific examples of a film material for the film-structured building, may be a tent film for an outdoor exhibition hall, a structural member having a lighting function of an arena ceiling, etc. As a film material to be used outdoors besides the film material for the film-structured building, for example, an agricultural material, etc. may be mentioned. However, application of the laminate of the present invention is not limited thereto.

[Printed Matter]

The printed matter of the present invention comprises the laminate of the present invention as described above and a printed layer formed directly on the layer (A) surface of this laminate.

In a case where the laminate of the present invention is one having a layer (A) on one side of the substrate, the printed layer is formed only on one side (the surface of the layer (A)) of the laminate. In a case where the laminate of the present invention is one having a layer (A) on each side of the substrate, the printed layer may be formed on only one side of the laminate or may be formed on each side.

In a case where the printed layer is formed only on one side of the laminate, the printed matter of the present invention may be a printed matter of a so-called back print system wherein a printed layer is formed on the opposite side surface to the viewing side of the laminate, or may be a printed matter of a so-called top-print system wherein a printed layer is formed on the surface on the viewing side of the laminate. In the case of the back print system, the printed layer is viewed through the laminate. In the case of the top print system, the printed layer is directly viewed without via the laminate. From the viewpoint of the utility of the present invention, the back print system is preferred.

Figure 3:
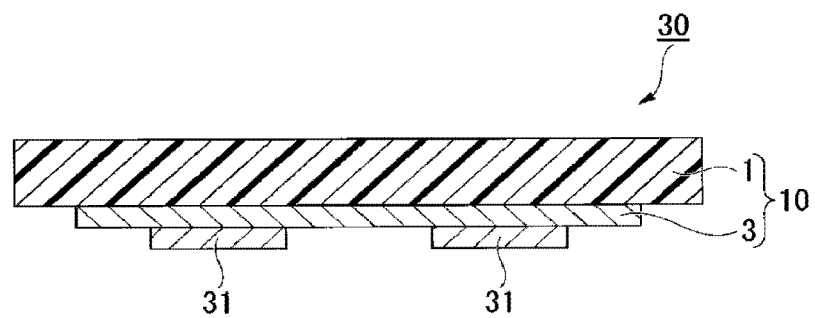
FIG. 3 is a schematic cross-sectional view showing an example of the printed matter of the present invention.

FIG. 3 is a schematic cross-sectional view showing an example of the printed matter of the present invention. A printed matter 30 in this example is a printed matter of a back print system, and the upper side in the FIG. is the viewing side. The printed matter 30 comprises a laminate 10 as shown in FIG. 1, and a printed layer 31. A layer (A) 3 of the laminate 10 is present on the opposite side to the viewing side of the substrate 1, and the printed layer 31 is formed directly on this layer (A) 3. Further, the printed layer 31 is formed on a part of the layer (A) 3.

(Printed Layer)

The thickness of the printed layer is at least 6 μm, preferably from 10 to 50 μm. When the thickness is at least the above lower limit value, visibility will be excellent. When the thickness is at most the above upper limit value, the time required for forming the printed layer can be shortened.

The printed layer with a thickness of at least 6 μm is typically an inkjet printed layer (a printed layer formed by an inkjet printing system). In the case of a printing system other than an inkjet printing system, it is difficult to form a printed layer with a thickness of at least 6 μm.

The printed layer is typically a layer made of a cured product of a curable composition, formed by applying and curing the curable composition by an inkjet printing system. The curable composition will be described later in detail.

The printed layer is formed in a predetermined pattern.

As the pattern, a pattern other than a single pattern is preferred. The pattern other than a single pattern may, for example, be characters (e.g. the owner's name or its logo, of the film-structured building on which the printed matter is used), design drawings, photos, etc.

The ratio of the area of the printed layer to the area of the laminate on one side of the laminate may be suitably selected depending on the purpose, etc., and it may, for example, be from 0.1 to 100%.

(Other Layers)

The printed matter of the present invention may further have, on the printed layer, a transparent coating layer to improve the water resistance or scratch resistance, a coating layer containing an antifogging material or a dripping material to prevent deterioration of visibility due to condensation of water vapor, etc.

(Method for Producing Printed Matter)

A method for producing the printed matter of the present invention may, for example, be a method wherein on the layer (A) surface of the laminate of the present invention, a curable composition is applied and cured by an inkjet printing system to form a printed layer.

The application and curing of the curable composition can be carried out by using a commercially available inkjet printer. The curing method may be a method of irradiating active energy rays such as UV, a method of heating, etc., and it may be suitably selected according to the curable composition.

<Curable Composition>

The curable composition is not particularly limited, and it is possible to use one which is known as an inkjet printing ink.

The curable composition may be one curable by active energy rays such as UV, may be one curable by heat, or may be one curable by both active energy rays and heat.

The inkjet printer may be one for aqueous ink, for solvent ink or for UV curing type, but preferred is a printer for printing a UV curable composition which requires no drying time.

The UV curable composition may, for example, be a composition comprising a polymerizable compound and a photopolymerization initiator, and, as the case requires, components other than these. For each of the respective components, various types may be used.

As the polymerizable compound, it is preferred to use one with a low viscosity, since if the viscosity is too high, there will be a trouble in dischargeability from a nozzle.

As the polymerizable compound, there are a radical polymerization type and a cation polymerization type by its curing reaction mechanism. From such a viewpoint that the curing drying speed is fast, the polymerizable compound is preferably a radical polymerization type, like a compound having an ethylenic double bond such as a (meth)acrylate.

The compound having an ethylenic double bond may, specifically, be a monofunctional monomer having one ethylenic double bond, a polyfunctional monomer having two or more ethylenic double bonds, a (meth)acrylate oligomer, etc. One of these may be used alone, or two or more of them may be used in combination.

The curable composition usually further contains a coloring agent.

The coloring agent may be a pigment, a dye, etc. Each of them may be one which is commonly used in conventional inkjet recording. The dye may be a direct dye, an acid dye, a food dye, a basic dye, a reactive dye, a disperse dye, a vat dye, a soluble vat dye, a reactive disperse dye, etc. The pigment may be an inorganic pigment, such as barium sulfate, lead sulfate, titanium oxide, yellow lead, red iron oxide, chromium oxide, carbon black, etc., an anthraquinone-type pigment, a perylene-type pigment, a disazo-type pigment, a phthalocyanine-type pigment, an isoindoline-type pigment, a dioxazine-type pigment, a quinacridone-type pigment, a perinone-type pigment, a benzimidazolone-type pigment, etc. One of these may be used alone, or two or more of them may be used in combination.

As the coloring agent, from the viewpoint of excellent weather resistance, a pigment is preferred.

Further, in color printing for general use, a cyan ink, a magenta ink, a yellow ink and a black ink using, respectively, a cyan pigment, a magenta pigment, a yellow pigment and a black pigment, may be used.

The content of the coloring agent in the curable composition may, for example, be from 0.5 to 10 mass %, in the total mass of the curable composition.

The curable composition may further contains a dispersing agent for the purpose of increasing dispersion stability of the pigment.

The curable composition may further contains a surface tension adjusting agent for the purpose of preventing defects such as cissing, dents, etc. of the ink coating film.

As the curable composition, a commercially available one may be used, or one prepared by a conventional method may be used. For example, a mixture comprising a pigment and a polymerizable compound, and having a dispersant, etc. added as the case requires, may be stirred by means of a stirring and dispersing device less likely to impart shearing, such as a bead mill, to disperse the pigment, then, a photopolymerization initiator may be added and further, as the case requires, an additive such as a surface tension adjusting agent, may be added, followed by stirring, to prepare a curable composition. It is also possible to prepare the curable composition by preliminarily preparing a highly concentrated pigment dispersion (mill base), and then suitably diluting it and adding additives thereto.

In the printed matter of the present invention, since the printed layer is formed directly on the layer (A) of the laminate of the present invention, as described above, adhesion of the printed layer is excellent. Not only immediately after formation of the printed layer, but also after the weathering test, the sufficiently excellent adhesion is maintained. Further, the layer (A) has excellent follow-up properties to deformation of the substrate, and it is less likely to peel from the substrate during the deformation of the substrate, whereby the printed layer formed on the layer (A) is also less likely to peel from the substrate.

Accordingly, the printed matter of the present invention is useful for an application to be used outdoors, particularly for a film-structured building. As specific examples of such an application, the same as those described above may be mentioned. However, applications of the printed matter of the present invention are not limited thereto.

The film material to be used outdoors may be one composed of a single film or one composed of a plurality of films. An example of the film material composed of a plurality of films may be one wherein a plurality of films are superimposedly mounted inside a frame, and a gas such as air is filled between the respective films.

In a case where the film material is composed of a single film, the printed matter of the present invention is used as the film. In a case where the film material is composed of a plurality of films, the printed matter of the present invention is used at least as part of the plurality of films.

In a case where the printed matter of the present invention is used as a film material to be used outdoors, it is preferred that the printed matter of the present invention is one having a printed layer provided only on one side of the laminate, and is disposed so that the printed layer side of the printed matter faces the opposite side (the indoor side in the case of a film-structured building) to the incident side of sunlight. As the printed layer is present on the opposite side to the side where sunlight enters, the printed layer is less susceptible to the influence of e.g. rain, whereby more excellent weather resistance is obtainable. Further, since the printed layer is provided on the substrate via the layer (A), it is possible to maintain the adhesion between the substrate and the printed layer.

If no layer (A) is provided, i.e. if the substrate and the printed layer are directly in contact with each other, adhesion at the interface between the substrate and the printed layer is mainly due to the chemical bonding of oxygen and hydrogen. However, the bonding will be reduced by irradiation with UV. In a case where a printed layer is present on the side of the substrate from which sunlight enters, by letting the ink used in inkjet printing (hereinafter referred to also as "inkjet ink".) have UV blocking performance, it is possible to increase the weather resistance (e.g. the durability of the adhesion) of the printed layer. However, in a case where the printed layer is present on the opposite side to the side where sunlight enters, the UV blocking performance which the inkjet ink has, will not be a force to protect the adhesion at the interface. Whereas, in the printed matter of the present invention, even if UV is incident on the print layer from the substrate side, the adhesion between the substrate and the printed layer is not easily reduced. Thus, usefulness of the present invention is high in a case where the printed layer is present on the opposite side to the side where sunlight enters.

Figure 4:
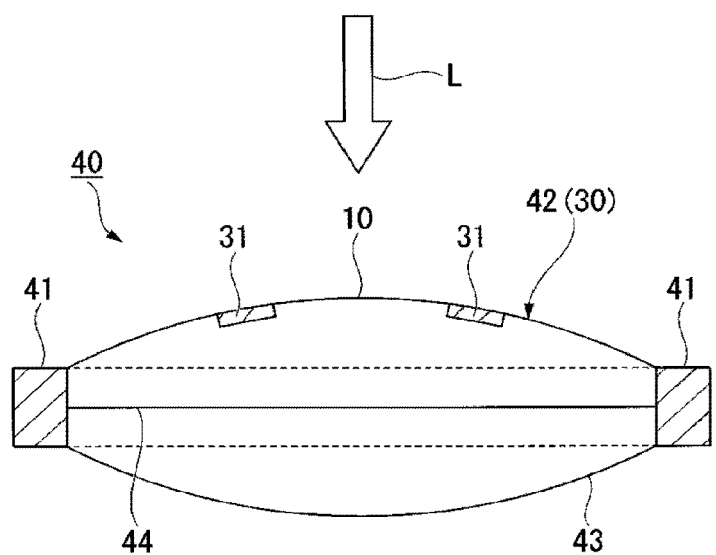
FIG. 4 is a schematic cross-sectional view showing an example of the film material.

A specific example of a printed matter which is disposed so that the printed layer side faces the opposite side to the side where sunlight enters, is shown in FIG. 4. FIG. 4 is an example of a film material using the printed matter of the present invention. The film material 40 in this example comprises a frame 41, and three films (the outermost layer film 42, the innermost layer film 43, the intermediate layer film 44) attached in the frame 41. The film material 40 is disposed outdoors (e.g. on a roof, outer wall, etc. of a film-structured building) so that sunlight L is incident from the outermost layer film 42 side (and exits from the innermost layer film 43 side).

Among the three films, the outermost layer film 42 is the printed matter 30 as shown in FIG. 3 (but the substrate 1 and the layer (A) 3 of the laminate 10 are not individually illustrated). The printed matter 30 is disposed so that the printed layer 31 side faces the opposite side to the side where sunlight L is incident (so that the laminate 10 side faces the side where sunlight L is incident).

The films other than the outermost layer film 42 (the innermost layer film 43, and the intermediate layer film 44) are films comprising a fluorinated polymer. It is also possible to use the printed matter of the present invention as such other films. In a case where other films are made of the printed matter of the present invention, the printed layer may be provided only on one side of the laminate, or may be provided on each side. Further, the printed matter may be disposed so that the printed layer side faces the side where sunlight enters.

In a case where the laminate side of the printed matter is the side where sunlight enters, it is preferred that either one or each of the substrate and the layer (A) of the laminate has a UV cutting function. That is, it is preferred that the film constituting the substrate contains a UV blocking agent, or the layer (A) contains a UV blocking agent.

By letting at least one of the substrate and the layer (A) have a UV cutting function, adhesion between the printed layer and the film can be better secured.

Further, in order to obtain a printed matter having weathering resistance at an equal level to the weather resistance of the film comprising a fluorinated polymer itself (i.e. weather resistance of at least 10 years), in addition to secure the adhesion between the printed layer and the film, it is important to prevent a color change (discoloration or color fading) of the printed layer. The discoloration is a loss of color due to decomposition of the pigment or sublimation of the dye by UV. Further, in the decomposition by UV of the pigment, it is considered that two reactions i.e. a reaction wherein the pigment itself is decomposed by UV, and a reaction wherein the acid concentration is increased by decomposition of the resin by UV and the pigment is chemically decomposed by this acid, take place.

By letting either one of the substrate and the layer (A) have a UV cutting function, it is possible to prevent the above reactions and to prevent the color change of the printed layer.

EXAMPLES

In the following, the present invention will be described in detail with reference to Examples. However, the present invention is not limited by the following description. "%" represents "mass %" unless otherwise specified.

Among Ex. 1 to 16 given later, Ex. 1, 3 to 5, 8, 12 to 13 and 15 to 16 are Examples of the present invention, and other Ex. are Comparative Examples.

The inkjet printing conditions, the evaluation methods and the materials used in each Ex. are shown below.

[Inkjet Printing Conditions]

In the present Examples, by using three types of inkjet printing apparatus, three types of UV curable inks (curable compositions) were inkjet printed. Hereinbelow, the combinations of the inkjet printing apparatus and the UV curable inks are shown. These three types of inkjet printing apparatus and three types of UV curable inks are commercially available UV inkjet printers and UV curable acrylic inks to be normally used for the printers. In each of the three types of UV curable inks, four colors of cyan (blue), magenta (pink), yellow (yellow) and black (black) were used.

Combination (a)

Inkjet printing apparatus: UJF-7151plus, manufactured by MIMAKI ENGINEERING CO., LTD.

UV curable inks: LUS-120 series, manufactured by MIMAKI ENGINEERING CO., LTD.

Combination (b)

Inkjet printing apparatus: Nyala 23200, manufactured by swissQprint.

UV curable inks: cyan is Product No. SQS CYAN, magenta is Product No. SQS MAGENTA, yellow is Product No. SQS YELLOW, black is Product No. SQS BLACK (each manufactured by swissQprint).

Combination (c)

Inkjet printing apparatus: LEC-330, manufactured by Roland DG Corporation.

UV curable inks: ECO-UV4 ink series, manufactured by Roland DG Corporation. Cyan is Product No. EUV4-CY, magenta is Product No. EUV4-MG, yellow is Product No. EUV4-YE, and black is Product No. EUV4-BK.

[Evaluation Methods]

(Visible Light Transmittance)

The visible light transmittance was measured in accordance with JIS R3106:1998 "Test methods for transmittance, reflectance, emissivity, solar radiation heat gain coefficient of sheet glasses" by using a spectrophotometer (UV-3100PC, manufactured by Shimadzu Corporation).

(UV Transmittance)

The UV transmittance was measured in accordance with JIS A5759:2008 "Film board for building window glass" by using a spectrophotometer.

(Dry Coated Mass)

The total mass of the substrate and the coating layer after applying and drying the coating liquid, and the mass of the substrate after removing the coating layer by Kimwipe paper moistened with acetone, were measured, and from their difference, the dry coated mass ($g/m^2$) of the coating liquid, i.e. the mass per unit area of the coating layer, was calculated.

In the case of gravure printing, by changing the depth of the gravure plate, it is optionally possible to change the dry coated mass of the coating liquid within a range of from 0.5 g to 20 $g/m^2$.

(Initial Adhesion)

A peeling test of repeating an operation of bonding a cellophane tape ("CT18" manufactured by Nichiban, width: 18 mm) to a printed layer and slowly peeling it, 5 times, was carried out. Thereafter, the state of the printed layer was visually observed to evaluate the adhesion of the printed layer by the following standards.

⊚ (good): There is no loss of the printed layer.

○ (acceptable): The loss of the printed layer is more than 0% and less than 20%.

× (unacceptable): The loss of the printed layer is more than 20%.

(Weathering Test)

To a printed matter, an accelerated weathering test for 5,000 hours was carried out by using a sunshine weather meter (300 Sunshine Weather Meter, manufactured by Suga Test Instruments Co., Ltd.) equipped with a carbon arc lamp in accordance with JIS K7350-4:2008. The exposure type was a back exposure format where water or light was not exposed directly to the printed layer. That is, light was permitted to enter from the substrate side (the opposite side to the printed layer side) of the printed matter, and water was sprayed on the substrate side. Here, the exposure for 5,000 hours is said to correspond to outdoor exposure for 10 years in Japan by the Japanese Film Structure Association.

A color change ($\Delta E^*$) of the reflected light before and after the accelerated weathering test was measured by using a color meter (SM Color Meter SM-T, manufactured by Suga Test Instruments Co., Ltd.). Further, with respect to the printed matter after the accelerated weathering test, a peeling test was carried out in the same manner as the evaluation of the initial adhesion, to evaluate the adhesion of the printed layer.

With respect to the color change, if it is at most 3, it can be judged that the color has not changed. A color change that is generally acceptable in the color management is at most 6. If it exceeds 20, the color is considered to be indistinguishable due to color fading.

[Materials]

(Substrate)

ETFE (1): On one side of an ETFE film with a thickness of 250 μm (product name: Aflex 250NJ, manufactured by Asahi Glass Company, Limited), corona discharge treatment was carried out at a discharge density of 200 W·min/$m^2$. The surface tension of the discharge-treated surface was 0.045 N/m.

ETFE (2): On one side of a UV-cut ETFE film having a thickness of 200 μm (product name: Aflex 200UVC, manufactured by Asahi Glass Company, Limited), corona discharge treatment was carried out at a discharge density of 180 W·min/$m^2$. The surface tension of the discharge-treated surface was 0.045 N/m. This film is a film obtained by blending 0.3 mass % of cerium oxide as a UV blocking agent in the film.

ETFE (3): On one side of a translucent white ETFE film having a thickness of 250 μm (product name: Aflex 250WT, manufactured by Asahi Glass Company, Limited), corona discharge treatment was carried out at a discharge density of 200 W·min/m². The surface tension of the discharge-treated surface was 0.045 N/m. This film is a film obtained by blending 0.4 mass % of titanium oxide as a white pigment in the film.

PET (1): On one side of a polyethylene terephthalate film having a thickness of 100 μm (product name: Teijin Tetron Film Type G2, manufactured by Teijin DuPont Films Ltd.), corona discharge treatment was carried out at a discharge density of 200 W·min/m². The surface tension of the discharge-treated surface was 0.054 N/m.

ECTFE (1): On one side of an ECTFE film having a thickness 50 μm (product name; TEFKA, manufactured by Denka Company Limited), corona discharge treatment was carried out at a discharge density of 100 W·min/m². The surface tension of the discharge-treated surface was 0.050 N/m.

(Coating Liquid)

Coating liquid (1): Toluene was added to LF200 (LUMI-FLON 200, manufactured by Asahi Glass Company, Limited, a xylene solution containing 60% of a solid content of a fluorinated polymer, glass transition temperature of the fluorinated polymer: 37° C.) to prepare a coating liquid (1) with 35% solid content. The hydroxy value as a product of LF200 is 31 mg(KOH)/g. The addition amount of toluene was adjusted to be such an amount that for performing gravure printing by a gravure plate, the No. 3 Zahn cup viscosity becomes to be 25 seconds.

Coating liquid (2): Toluene and a UV blocking agent (TINUVIN 479, manufactured by BASF Japan Ltd., hydroxyphenyl triazine-type UV blocking agent) were added to LF600 (LUMIFLON 600, manufactured by Asahi Glass Company, Limited, a xylene solution containing 50% of a solid content of a fluorinated polymer, glass transition temperature of the fluorinated polymer: 25° C.), to prepare a coating liquid (2) with 35% solid content. The hydroxy value as a product of LF600 is 20 mg(KOH)/g. The addition amount of the UV blocking agent was adjusted to be 17.6 parts by mass to 100 parts by mass of the fluorinated polymer. The addition amount of toluene was adjusted to be such an amount that for performing gravure printing by a gravure plate, the No. 3 Zahn cup viscosity becomes to be 25 seconds.

Coating liquid (3): A transparent 2-component urethane-type ink of Seiko Advance Ltd. (main agent: SG740 Medium, curing agent: SG740 dedicated curing agent, mixing mass ratio: 10:1) was diluted with methyl ethyl ketone to prepare a coating liquid (3) with 30% solid content. The addition amount of methyl ethyl ketone was adjusted to be such an amount that for performing gravure printing by a gravure plate, the No. 3 Zahn cup viscosity becomes to be 25 seconds.

Ex. 1

ETFE (1) was used as the substrate. On the discharge treated surface of this substrate, the coating liquid (1) was applied by gravure printing using a gravure plate, in a dry coated amount as shown in Table 1, and dried at 120° C. for 20 seconds to form a coating layer to obtain a laminate.

Next, using an inkjet printing apparatus, UV curable inks were applied on the coating layer of the laminate and subjected to UV curing to form a printed layer, to obtain a printed matter. The combination of the inkjet printing apparatus and the UV curing inks was the above combination (a). As the UV curable inks, each of four colors of cyan, magenta, yellow and black was used to form a printed layer for each color. The thickness of the printed layer for each color was 19 μm for cyan, 17 μm for magenta, 12 μm for yellow and 20 μm for black (the same applies in Ex. 2 to 9 where the inkjet printing conditions are the same).

Ex. 2

A printed matter was obtained in the same manner as in Ex. 1 except that without forming a coating layer, a printed layer was formed directly on the discharge treated surface of the substrate.

Ex. 3 to 5 and 7 to 9

A laminate and a printed matter were obtained in the same manner as in Ex. 1 except that the substrate or the coating liquid was changed to one as shown in Table 1.

Ex. 6

A printed matter was obtained in the same manner as in Ex. 5 except that without forming a coating layer, a printed layer was formed directly on the discharge treated surface of the substrate.

Ex. 10

A printed matter was obtained in the same manner as in Ex. 2 except that the combination of the inkjet printing apparatus and the UV curable inks was changed to the above combination (b). The thickness of the printed layer for each color was 11 μm for cyan, 14 μm for magenta, and 10 μm for yellow and 20 μm for black (the same applies in Ex. 11 to 13 where the inkjet printing conditions are the same).

Ex. 11

A printed matter was obtained in the same manner as in Ex. 10 except that the substrate was changed to ETFE (2).

Ex. 12

A laminate and a printed matter were obtained in the same manner as in Ex. 3 except that the combination of the inkjet printing apparatus and the UV curable inks was changed to the above combination (b).

Ex. 13

A laminate and a printed matter were obtained in the same manner as in Ex. 4 except that the combination of the inkjet printing apparatus and the UV curable inks was changed to the above combination (b).

Ex. 14

A printed matter was obtained in the same manner as in Ex. 2 except that the combination of the inkjet printing apparatus and the UV curable inks was changed to the above combination (c). The thickness of the printed layer for each color was 13 μm for cyan, 19 μm for magenta, 20 μm for yellow and 34 μm for black (the same applies in Ex. 15 and 16 where the inkjet printing conditions are the same).

Ex. 15

A laminate and a printed matter were obtained in the same manner as in Ex. 1 except that the combination of the inkjet printing apparatus and the UV curable inks was changed to the above combination (c).

Ex. 16

A laminate and a printed matter were obtained in the same manner as in Ex. 3 except that the combination of the inkjet printing apparatus and the UV curable inks was changed to the above combination (c).

In each Ex., the type, thickness, visible light transmittance and UV transmittance of substrate, the type of the coating liquid, the dry coated mass, the visible light transmittance and UV transmittance of the laminate, as well as the evaluation results of the printed matter are shown in Tables 1 and 2.

TABLE 1

| | Ex. | | 1 | 2 | 3 | 4 | 5 | 6 | 7 | 8 | 9 |
|---|---|---|---|---|---|---|---|---|---|---|---|
| Substrate | Type | | ETFE (1) | ETFE (1) | ETFE (2) | ETFE (1) | ETFE (3) | ETFE (3) | PET (1) | ECTFE (1) | ETFE (1) |
| | Thickness (μm) | | 250 | 250 | 200 | 250 | 250 | 250 | 100 | 50 | 250 |
| | Visible light transmittance (%) | | 90.8 | 90.8 | 87.6 | 90.8 | 35.6 | 35.6 | 83.1 | 93.6 | 90.8 |
| | UV transmittance (%) | | 87.6 | 87.6 | 35.2 | 87.6 | 0.3 | 0.3 | 32.2 | 90.1 | 87.6 |
| Coating layer | Type of coating liquid | | (1) | Nil | (1) | (2) | (1) | Nil | (1) | (1) | (3) |
| | Dry coated mass (g/m²) | | 6 | | 6 | 10 | 6 | | 6 | 6 | 6 |
| Laminate | Visible light transmittance (%) | | 90.1 | — | 86.6 | 88.6 | 34.1 | — | 82.6 | 92.3 | 86.2 |
| | UV transmittance (%) | | 86.5 | | 34.1 | 1.2 | 0.1 | | 82.2 | 88.2 | 76.1 |
| Visible light transmittance difference (%) | | | 0.8 | — | 1.1 | 2.4 | 4.2 | — | 0.6 | 1.4 | 5.1 |
| | Inkjet printing conditions | | | | | | Combination (a) | | | | |
| Cyan | Initial | Adhesion | ◎ | ◎ | ◎ | ◎ | ◎ | ◎ | ◎ | ◎ | ◎ |
| | After weathering test | ΔE* of reflected light | 8.5 | 7.8 | 4.8 | 3.8 | 2.1 | 2.0 | 21.1 | 9.0 | 23.2 |
| | | Adhesion | ○ | X | ◎ | ◎ | ◎ | X | X | ◎ | X |
| Magenta | Initial | Adhesion | ◎ | ◎ | ◎ | ◎ | ◎ | ◎ | ◎ | ◎ | ◎ |
| | After weathering test | ΔE* of reflected light | 8.0 | 11.9 | 3.4 | 2.9 | 1.6 | 1.4 | 22.9 | 9.2 | 25.6 |
| | | Adhesion | ○ | X | ◎ | ◎ | ◎ | X | X | ◎ | X |
| Yellow | Initial | Adhesion | ◎ | ◎ | ◎ | ◎ | ◎ | ◎ | ◎ | ◎ | ◎ |
| | After weathering test | ΔE* of reflected light | 19.1 | 18.0 | 4.7 | 2.8 | 2.2 | 2.2 | 16.0 | 18.8 | 15.9 |
| | | Adhesion | ○ | X | ◎ | ◎ | ◎ | X | X | | X |
| Black | Initial | Adhesion | ◎ | ◎ | ◎ | ◎ | ◎ | ◎ | ◎ | ◎ | ◎ |
| | After weathering test | ΔE* of reflected light | 19.3 | 17.8 | 4.8 | 2.7 | 1.1 | 1.0 | 15.6 | 17.5 | 24.1 |
| | | Adhesion | ◎ | X | ◎ | ◎ | ◎ | X | X | ◎ | X |

TABLE 2

| | Ex. | | 10 | 11 | 12 | 13 | 14 | 15 | 16 |
|---|---|---|---|---|---|---|---|---|---|
| Substrate | Type | | ETFE (1) | ETFE (2) | ETFE (2) | ETFE (1) | ETFE (1) | ETFE (1) | ETFE (2) |
| | Thickness (μm) | | 250 | 200 | 200 | 250 | 250 | 250 | 200 |
| | Visible light transmittance (%) | | 90.8 | 87.6 | 87.6 | 90.8 | 90.8 | 90.8 | 87.6 |
| | UV transmittance (%) | | 87.6 | 35.2 | 35.2 | 87.6 | 87.6 | 87.6 | 35.2 |
| Coating layer | Type of coating liquid | | Nil | Nil | (1) | (2) | Nil | (1) | (1) |
| | Dry coated mass (g/m²) | | | | 6 | 10 | | 6 | 6 |
| Laminate | Visible light transmittance (%) | | — | — | 86.6 | 88.6 | — | 90.1 | 86.6 |
| | UV transmittance (%) | | — | — | 34.1 | 1.2 | — | 86.5 | 34.1 |
| Visible light transmittance difference (%) | | | — | — | 1.1 | 2.4 | — | 0.8 | 1.1 |
| | Inkjet printing conditions | | Combination (b) | | | | Combination (c) | | |
| Cyan | Initial | Adhesion | ◎ | ◎ | ◎ | ◎ | ◎ | ◎ | ◎ |
| | After weathering test | ΔE* of reflected light | 6.1 | 1.1 | 2.2 | 2.1 | 7.2 | 7.0 | 2.0 |
| | | Adhesion | X | X | ◎ | ◎ | X | ○ | ◎ |
| Magenta | Initial | Adhesion | ◎ | ◎ | ◎ | ◎ | ○ | ◎ | ◎ |
| | After weathering test | ΔE* of reflected light | 10.5 | 4.6 | 4.9 | 3.0 | 12.6 | 12.0 | 2.1 |
| | | Adhesion | X | X | ◎ | ◎ | X | ○ | ◎ |
| Yellow | Initial | Adhesion | ◎ | ◎ | ◎ | ◎ | ◎ | ◎ | ◎ |
| | After weathering test | ΔE* of reflected light | 7.3 | 2.6 | 3.2 | 2.8 | 9.2 | 10.3 | 3.5 |
| | | Adhesion | X | X | ◎ | ◎ | X | ○ | ◎ |
| Black | Initial | Adhesion | ◎ | ◎ | ◎ | ◎ | ◎ | ◎ | ◎ |
| | After weathering test | ΔE* of reflected light | 3.5 | 0.6 | 3.4 | 1.1 | 3.9 | 3.8 | 2.8 |
| | | Adhesion | X | X | ◎ | ◎ | X | ○ | ◎ |

In each of Ex. 1, 3 to 5, 8, 12 to 13 and 15 to 16, the printed layer of the printed matter showed good adhesion both at the initial stage and after the weathering test. Particularly in Ex. 3 to 5, 12 to 13 and 16 wherein the substrate or the layer (A) had a UV cutting function, lowering of the adhesion before and after the weathering test was more suppressed, and further, the color change of the printed layer was also suppressed. Further, cracks were not observed in the printed layer after the weathering test.

On the other hand, the printed layer of the printed matter in each of Ex. 2, 6, 10 to 11 and 14 showed good adhesion at the initial stage, but since no layer (A) was provided, the adhesion was greatly reduced by the weathering test. Further, cracks were observed in the printed layer after the weathering test. From this result, it is evident that in order to secure the adhesion between the substrate and the printed layer in the weathering test, it is more effective to mitigate the shrinkage stress of the inkjet ink by the layer (A) than to inhibit the attack of UV to chemical bonds at their interface.

The printed layer of the printed matter in Ex. 7 showed good adhesion at the initial stage, but since the substrate does not contain a fluorinated polymer, the adhesion was greatly reduced by the weathering test. Further, in cyan and magenta, the color change of the reflected light ($\Delta E^*$) exceeded 20. This is considered to be such that the PET film itself had no weather resistance as the substrate, and therefore, hydrolysis and yellowing of the film occurred, whereby the influence appeared.

The printed layer of the printed matter in Ex. 9 showed good adhesion at the initial state, but, since the layer formed from the coating liquid is not a layer (A), the adhesion was greatly reduced by the weathering test. Further, in cyan, magenta and black, the color change of the reflected light ($\Delta E^*$) exceeded 20. This is considered to be such that the primer layer being a urethane system underwent yellowing, and its influence appeared.

INDUSTRIAL APPLICABILITY

As described above, the printed layer formed on the layer (A) of the laminate of the present invention is excellent in adhesion to the substrate, and can maintain its adhesion even in an accelerated weathering test for a long period of time. Particularly when the substrate or the layer (A) has a UV cutting function, it is also possible to prevent a color change of the printed layer.

Applications of the laminate or the printed matter of the present invention are not particularly limited, but it is suitable for applications to be used outdoors. As specific examples, a tent film in a show room or a structural member having a lighting function at arena ceiling, an agricultural material, etc. may be mentioned.

This application is a continuation of PCT Application No. PCT/JP2018/012206, filed on Mar. 26, 2018, which is based upon and claims the benefit of priority from Japanese Patent Application No. 2017-063211 filed on Mar. 28, 2017. The contents of those applications are incorporated herein by reference in their entireties.

REFERENCE SYMBOLS

1: Substrate, 3: layer (A), 10: laminate, 20: laminate, 30: printed matter, 31: printed layer, 40: film material, 41: frame, 42: outermost layer film, 43: innermost layer film, 44: intermediate layer film

What is claimed is:

1. A laminate, comprising:
a film-shaped substrate containing a first fluorinated polymer; and
a coating layer containing a second fluorinated polymer different from the first fluorinated polymer, and directly contacting with one side or each side of the substrate, wherein
visible light transmittance of the substrate is 0%, or more than 0%, and
when the visible light transmittance of the substrate is more than 0%, a visible light transmittance difference calculated by the formula (1), is at most 40%:

Visible light transmittance difference={(visible light transmittance of the substrate−visible light transmittance of the laminate)/visible light transmittance of the substrate}×100(%)　　(1).

2. The laminate according to claim 1, wherein the visible light transmittance difference is from 0 to 10%.

3. The laminate according to claim 1, wherein the substrate has a thickness of from 25 to 1,000 μm.

4. The laminate according to claim 1, wherein the first fluorinated polymer is at least one type selected from the group consisting of a vinyl fluoride polymer, a vinylidene fluoride polymer, a vinylidene fluoride-hexafluoropropylene copolymer, a tetrafluoroethylene-hexafluoropropylene-vinylidene fluoride copolymer, a tetrafluoroethylene-propylene copolymer, a tetrafluoroethylene-vinylidene fluoride-propylene copolymer, an ethylene-tetrafluoroethylene copolymer, a hexafluoropropylene-tetrafluoroethylene copolymer, an ethylene-hexafluoropropylene-tetrafluoroethylene copolymer, a perfluoro(alkyl vinyl ether)-tetrafluoroethylene copolymer, a chlorotrifluoroethylene polymer, an ethylene-chlorotrifluoroethylene copolymer and a propylene-chlorotrifluoroethylene copolymer.

5. The laminate according to claim 1, wherein the second fluorinated polymer has a glass transition temperature of from 20 to 70° C.

6. The laminate according to claim 1, wherein the second fluorinated polymer has at least one type of polar group selected from the group consisting of a hydroxy group, a carboxy group, an amido group and a glycidyl group.

7. The laminate according to claim 6, wherein the second fluorinated polymer comprises a monomer unit having the polar group.

8. The laminate according to claim 1, wherein the second fluorinated polymer comprises a fluoroolefin unit.

9. The laminate according to claim 1, wherein the substrate further contains an ultraviolet blocking agent.

10. The laminate according to claim 1, wherein the coating layer further contains an ultraviolet blocking agent.

11. A method, comprising:
printing the laminate according to claim 1 by inkjet printing,
wherein a surface of the laminate having the coating layer is printed.

12. A film-structured building, comprising:
a film material comprising the laminate according to claim 1.

13. A printed matter, comprising:
the laminate according to claim 1; and
a printed layer with a thickness of at least 6 μm directly formed on the coating layer of the laminate.

14. A method for producing a printed matter, comprising:
forming a printed layer by applying and curing a curable composition by an inkjet printing system directly on the coating layer of the laminate according to claim 1.

15. The method according claim 14, wherein the curable composition is an ultraviolet-curable curable composition.

16. The laminate according to claim 1, wherein the visible light transmittance of the substrate is 0%.

17. The laminate according to claim 1, wherein the visible light transmittance difference is from 0 to 5%.

18. The laminate according to claim 1, wherein the coating layer forms an outermost layer of the laminate, and the coating layer does not have tackiness at room temperature.

19. The laminate according to claim 1, wherein the laminate comprises a pair of the coating layers each directly contacting each side of the substrate.

20. The printed matter of claim 13, wherein the coating layer forms an outermost layer of the laminate, the coating layer does not have tackiness at room temperature, and the printed layer is formed on a part of the coating layer.

* * * * *